(12) United States Patent
Lam (10) Patent No.: US 10,171,969 B2
(45) Date of Patent: Jan. 1, 2019

(54) SYSTEM INCLUDING ALTERNATION OF SENSOR CONNECTION AND TRANSMISSION MECHANISM FOR MOTION SENSING GARMENT (71) Applicant: Cho Wing Lam, Hong Kong (HK)

(72) Inventor: Cho Wing Lam, Hong Kong (HK)

( * ) Notice: Subject to any disclaimer, the term of this patent is extended or adjusted under 35 U.S.C. 154(b) by 105 days.

(21) Appl. No.: 15/284,543

(22) Filed: Oct. 4, 2016

(65) Prior Publication Data

US 2017/0195821 A1    Jul. 6, 2017

Related U.S. Application Data

(60) Provisional application No. 62/273,465, filed on Dec. 31, 2015.

(51) Int. Cl.
*H04W 4/02* (2018.01)
*H04W 4/70* (2018.01)
*H04W 4/38* (2018.01)
*H04W 4/80* (2018.01)
H04W 84/18 (2009.01)
H04W 84/20 (2009.01)

(52) U.S. Cl.
CPC ............ *H04W 4/70* (2018.02); *H04W 4/02* (2013.01); *H04W 4/38* (2018.02); *H04W 4/80* (2018.02); *H04W 84/18* (2013.01); *H04W 84/20* (2013.01)

(58) Field of Classification Search
CPC ..... H04W 4/005; H04W 4/006; H04W 4/008; H04W 4/02; H04W 84/18; H04W 84/20
See application file for complete search history.

(56) References Cited

U.S. PATENT DOCUMENTS

2011/0116416 A1* 5/2011 Dobson ............... H04W 40/20 370/255
2013/0231760 A1* 9/2013 Rosen ................. G06F 17/40 700/91

(Continued)

FOREIGN PATENT DOCUMENTS

CN    102256303 A    11/2011

OTHER PUBLICATIONS

International Search Report of PCT Patent Application No. PCT/CN2016/101425 dated Jan. 12, 2017.

*Primary Examiner* — Asad M Nawaz
*Assistant Examiner* — Zhaohui Yang (57) ABSTRACT

Disclosed is a system and method for facilitating wireless communication amongst sensors attached to wearables. Each of the sensors may be configured to operate either as a master device or a slave device. Further, the sensors may be inter-communicatively coupled to establish a sensor communication network wherein one of the sensors operates as the master device and the other sensors operates as the slave devices. Further, a set of sensors may be configured to broadcast metadata information to at least one other sensor within the sensor communication network. Further, the said sensor communication network may be updated based upon the metadata information received from the set of sensors to form an updated sensor communication network. The said sensor communication network may be updated by swapping one of the slave devices with the said master device to operate as a new master device for the said updated sensor communication network.

14 Claims, 10 Drawing Sheets

(56) References Cited

U.S. PATENT DOCUMENTS

2016/0174039 A1* 6/2016 Huang ................ H04W 4/023
                                                    455/456.3
2017/0367578 A1* 12/2017 Melodia ............... A61B 5/0015

* cited by examiner

SYSTEM INCLUDING ALTERNATION OF SENSOR CONNECTION AND TRANSMISSION MECHANISM FOR MOTION SENSING GARMENT

CROSS-REFERENCE TO RELATED APPLICATIONS AND PRIORITY

The present application claims priority from U.S. Provisional Patent Application. No 62/273,465 dated Dec. 31, 2015, incorporated herein as a reference.

TECHNICAL FIELD

The present subject matter described herein, in general, relates to a wireless communication system facilitating wireless communication amongst a plurality of sensor devices attached to one or more wearables associated to a user.

BACKGROUND

With the advent of communication technology, smart communication devices such as smart sensors have been employed to sense various physical parameters associated to activities of the users. Such applications where these sensors are employed include monitoring the motion characteristics (e.g. running, stretching, hopping, skipping etc.) by capturing motion data of the user while performing physical exercise, or playing indoor/outdoor sports by the user. The motion data may be transmitted to the user device for further processing and analysis.

In the current scenario, the smart sensors are integrated within the wearables (e.g. garments, watches etc.) of the user in order to facilitate easy tracking of the motion data of the user while performing the physical exercise or playing the sports. It is to be noted that several sensors are configured to capture the motion data and hence the motion data collected/captured via multiple sensors requires synchronization/co-ordination for effective and fruitful data processing and analysis.

SUMMARY

This summary is provided to introduce concepts related to systems and methods for facilitating wireless communication amongst a plurality of sensors and the concepts are further described below in the detailed description. This summary is not intended to identify essential features of the claimed subject matter nor is it intended for use in determining or limiting the scope of the claimed subject matter.

In one implementation, a wireless communication system is disclosed. The wireless communication system may comprise a plurality of sensors attached to one or more wearables. In an aspect, each of the plurality of sensors may be configured to operate either as a master device or a slave device. Further, the plurality of sensors may be inter-communicatively coupled to establish a sensor communication network wherein one of the sensors operates as the master device and the other sensors operates as the slave devices. Further, a set of sensors, of the plurality of sensors, may be configured to broadcast metadata information to at least one other sensor within the sensor communication network. Further, the said sensor communication network may be updated based upon the metadata information received from each of the set of sensors to form an updated sensor communication network. In an aspect, the said sensor communication network may be updated by swapping one of the slave devices with the said master device. The slave device being swapped is configured to operate as a new master device for the said updated sensor communication network.

In another implementation, a method for facilitating wireless communication amongst a plurality of sensors is disclosed. The method may comprise providing a plurality of sensors attached to one or more wearables. In an aspect, each of the plurality of sensors may be configured to operate either as a master device or a slave device. Further, the method may comprise establishing a sensor communication network wherein one of the sensors operates as the master device and the other sensors operates as the slave devices. The method may further comprise broadcasting, by set of sensors of the plurality of sensors, metadata information to at least one other sensor within the sensor communication network. Further, the method may comprise updating the said sensor communication network based upon the metadata information received from each of the set of sensors to form an updated sensor communication network. In an aspect, the said sensor communication network is updated by swapping one of the slave devices with the said master device. The slave device being swapped is configured to operate as a new master device for the said updated sensor communication network.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

System(s) and method(s) for facilitating wireless communication amongst multiple sensors are described. The multiple sensors may be attached to multiple wearables including garments, watches, ornaments, and the like. The multiple sensors may be attached to the multiple wearables in order to monitor motion data and biometric data of users wearing the said multiple wearables. Each of the multiple sensors may be required to capture the data (the motion data and biometric data) and synchronize the data captured by the other sensors in order to coordinate and effectivity track various motion and biometric characteristic of the users. Therefore, the multiple sensors may be configured to connect via wireless communication protocol including Bluetooth, Wi-Fi, ZigBee and Near field communication (NFC) in order to facilitate the transmission and synchronization of the data captured by each sensor.

In accordance to aspects of the present disclosure, the multiple sensors may be configured in a master-slave configuration, wherein each sensor is capable of operating either as a master device or a slave device. Each slave device may be configured to capture the data (i.e. the motion data and the biometric data) and transmit to communication devices (e.g. mobile devices) of the users via the master device. Therefore, the master device collates the data captured by each slave device and transmits the data collated to the communication devices or the wearables themselves. However, there exist challenges with respect to data handling/processing capabilities of each respective sensor due to various factors including signal blockage/interference, signal attenuation and different motions of the users in different directions. In one example, if the master device is shielded, significant data loss may occur thereby resulting in failure of the processing and analysis of the motion data by the master device. Therefore, the sensor operating as the master device in a fixed location may not ensure the stability of data transmission throughout different environments and for different sports. Thus, the present disclosure enables adaptive switching/swapping of master device to the slave device and vice-versa as per the different environments and the different sports in order to facilitate signal enhancement, transmission stability and power saving.

In accordance with aspect of the present disclosure, initially a sensor communication network (also referred as a default sensor communication network) may be formed of the multiple sensors arranged in the master-slave configuration wherein one of the sensors operate as a default master device whereas the other sensors operate as slave devices. The slave devices transmit the data captured to the communication devices via the default master device. The data may be transmitted by each slave device in response to an input received from the communication devices attached to the multiple wearables. Specifically, the input received from communication devices may facilitate activation of each of the sensors and in turn the activation of the default sensor communication network itself. In some embodiments, a wearable itself may act as a smart communication device thereby replacing the communication devices within the system.

According to the aspects of the present disclosure, the default master device may be adaptively switched/swapped with one of the slave devices to form an updated sensor communication network wherein the slave device being swapped with the default master device is configured to operate as a new master device for the updated sensor communication network. The default sensor communication network may be updated to form the updated sensor communication network based upon metadata information broadcasted by a set of sensors of the multiple sensor devices within the default sensor communication network. The metadata information may be broadcasted by each sensor via the communication protocol selected from a group comprising Bluetooth, Wi-Fi, ZigBee and Near field communication (NFC). Further, the metadata information broadcasted by each of the set of sensors may comprise a sensor identifier, location of the one or more wearables, a battery level of the sensor, and a current time.

The broadcasted metadata information of each of the set of sensors is received by one or more sensors within the default sensor communication network. The broadcasted metadata information may be processed by a processor present within the default master device or the one or more communication devices. Specifically, the processor may process the metadata information pertaining to each sensor in order to determine a first signal level indicative of signal strength (dBm) between each sensor and at least one other sensor, a second signal level (dBm) indicative of signal strength between each sensor and the communication devices, and a relative signal strength (dBm) of each sensor. In one example, in a default sensor communication network (N) consisting of four sensors including one master device (M1) and three slave devices (S1, S2, S3) attached to a garment (W) in communication with a smartphone (Mo), the processor within the M1 or the Mo may process the metadata information pertaining to M1, S1, S2, S3 in order to determine the signal strength between M1 and S1, M1 and S2, M1 and S3, M1 and Mo, S1 and S2, S1 and S3, S1 and Mo, S2 and S3, S2 and Mo, S3 and Mo. Further, the processor may determine a relative signal strength for each of the M1, S1, S2 and S3.

In accordance with the aspects of the present disclosure, the determination of signal strengths in terms of dBm may be repeated after every predefined interval. Based upon the determination of the signal strengths of each sensor, the processor may identify one of the slave devices in the default sensor communication network as the sensor having maximum relative signal strength as compared to other sensor devices. The identified sensor is selected as a new master device for the updated sensor communication network. Therefore, the default master device in the default sensor communication network is swapped with the new master device identified based upon analysis of the relative signal strength of each sensor within the default sensor communication network. The new master device along with other sensors operating as the new slave device thereby forms the updated sensor communication network for the capturing of the data and thereafter analysis of the data. The updated sensor communication network may be configured to return to the default sensor communication network as-soon-as the users finish with the activities related to the sports corresponding to which the motion data is being captured.

In accordance with other aspects of the present disclosure, in order to facilitate the power optimization, some of the multiple slave devices in the default sensor communication network remain in inactivated state but are in connection with the default master device. Based upon the sport selected by the user of the communication device, the communication device may transmit sports commands to these slave devices through the default master device. The unused sensors (or the inactivated sensors) of the slave devices are switched to inactivated state. Further, only the slave devices in the activated state (activated sensors) are configured to broadcast the respective metadata information to the processor of the default master device or the communication device in order to select the new master device for the updated sensor communication network based upon the analysis of the metadata information by the said processor.

In accordance with other aspects of the present disclosure, the user may select a relevant sport and send sports commands to the default master device of a default sensor communication network. The default master device may further broadcast inactivated commands to indicate the inactive sensors (or the unused sensors) of the multiple slave devices. The master device further transmits the sports commands to the activated sensors. The activated sensors of the multiple slave devices are configured to broadcast the metadata information. The processor of the default master device or the communication device may process the broadcast information to determine the signal strength of each activated sensor with other activated sensors, the signal strength of each activated sensor with the communication device and the relative signal strength of each activated sensor. Further, the processor may analyze the relative signal strength and the battery level of each activated sensor to designate each activated sensor as a primary sensor or a secondary sensor. The primary sensor is responsible for collecting the motion data and the biometric data of the users of the communication device whereas the secondary sensor acts as a backup of the primary sensor. Therefore, though the secondary sensor remains in activated state and is connected with the master device, it is not responsible for data collection thereby facilitating the power optimization of the wireless communication system.

It is to be noted that the analysis of the signal strengths and the battery levels of each of the activated sensors are continuously performed during the performance of one or more activities related to the sport by the user. Due to various environmental conditions, the signal strengths and the battery levels may be changed and hence the status of the primary sensor and the secondary sensor may be interchanged. Specifically, based upon the varied signal strength and the battery level, the primary sensor may be swapped with the secondary sensor such that the secondary sensor operates as the new primary sensor responsible for capturing the data in the updated sensor communication network. In this scenario, the original primary sensor may be configured to operate as a new secondary sensor in the updated sensor communication network. The new secondary sensor, though, not configured to collect the data is connected with the master device in activated state with low power consumption thereby facilitating the optimization of the power of the system.

In accordance with various aspects of the present disclosure, the aforementioned switching/swapping of the master device to the slave device and vice versa and the switching/swapping of the primary sensor to the secondary sensor and vice versa is continuously performed until the physical activities associated with the sport selected by the user is completed and abort commands indicative of the completion of the physical activities are received from the communication devices by the slave devices via the master device in the sensor communication network. After the completion of the physical activities of the sport, the multiple sensor devices may be configured to operate in the default sensor communication network.

In accordance with further aspects of the disclosure, the aforementioned sensor communication network or the updated sensor communication network is not limited to include sensors within a single wearable (e.g. a garment) and hence may be extended to multiple garments. For example, the sensors inter-connected via the sensor communication networks may belong to the upper and lower body garments of a single user or the garments owned by different individuals. Each sensor may further contain Master and Slave protocol which enables each sensor to operate as a master and a slave simultaneously. The data generated by each individual sensor may be transmitted through garments network and data may be uplinked to a backend server (e.g. a cloud server) through the communication devices in communication with the said garments via an internet connection. While aspects of described system and method for facilitating wireless communication amongst multiple sensors attached to one or more wearables may be implemented in any number of different computing systems, environments, and/or configurations, the embodiments are described in the context of the following exemplary system.

Figure 1:
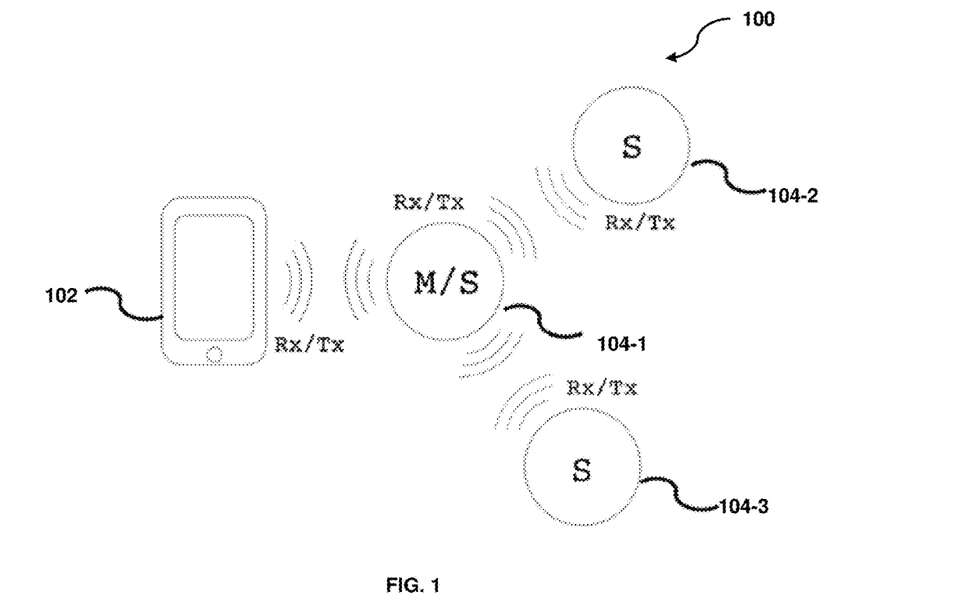
FIG. 1 illustrates a wireless communication system 100 facilitating wireless communication amongst a plurality of sensors attached to one or more wearables in communication with one or more communication devices, in accordance with an embodiment of the present disclosure.

Referring to FIG. 1 is a wireless communication system 100 facilitating wireless communication amongst a plurality of sensors attached to one or more wearables in communication with one or more communication devices, in accordance with an embodiment of the present disclosure. As shown, a communication device 102 is communicatively coupled to a plurality of sensors 104-1, 104-2, 104-3 . . . 104-N (hereinafter referred as sensors 104 collectively or a sensor 104 interchangeably). In some embodiments, more than one communication devices 102 may be communicatively coupled with the sensors 104. Examples of the communication devices 102 may include, but are not limited to, a portable computer, a personal digital assistant (PDA), a handheld device, a wearable device, a workstation, and the like.

Figure 2:
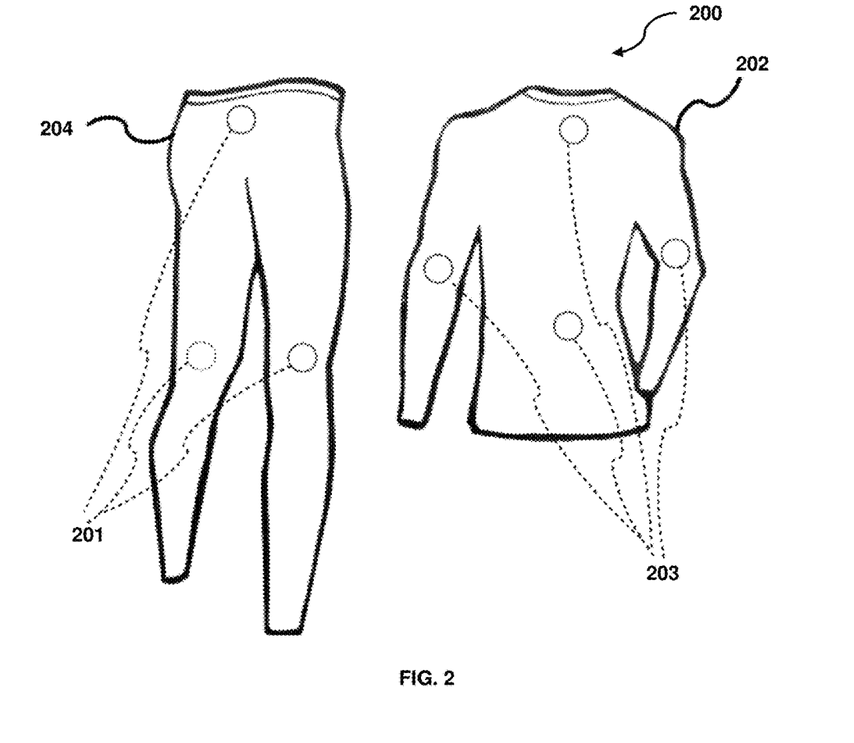
FIG. 2 illustrates an exemplary implementation 200 of the wireless communication system 100 showing a wearable (e.g. a garment) attached with sensors, in accordance with an embodiment of the present disclosure.

In one embodiment, the communication device 102 may communicate with the sensors 104 via one or more wearables. In some embodiments, the one or more wearables themselves act as the communication device. The sensors 104 may be attached to the one or more wearables. In one example, the one or more wearables may include at least one of a garment, a watch, an ornament and the like. FIG. 2 illustrates an example wherein the wearables including an upper garment 202 and a lower garment 204, are shown. In one embodiment, the upper garment 202 and the lower garment 204 may be configured to operate as motion sensing garments using the sensors (acting as motion sensors) for capturing motion data associated to various physical activities related to different sports performed by a user wearing the upper garment 202 and the lower garment 204. Further, each sensor may be configured to capture biometric data associated to the user in order to identify the user whose motions are to be tracked while performing the physical activities.

Now referring to FIG. 1, in order to facilitate the transmission and synchronization of the motion data and the biometric data (collectively hereinafter referred as "user data") associated to the user, each sensor 104 may be configured to transmit and receive the user data and/or other data/information to/from other sensors 104 or the communication device or any external devices. Hence, each sensor 104 may act as a transmitter (Tx) and receiver (Rx). Each sensor 104 may be configured to transmit and/or receive the data via a wireless communication protocol selected from a group comprising at least one of Bluetooth, Wi-Fi, ZigBee, Near field communication (NFC), and the like. Further, the wireless communication protocol stack may be configured to include a master-slave protocol enabling each sensor to operate as a master device or a slave device. In one example, as shown in FIG. 1, the sensors 104-1, 104-2 and 104-3 collectively form a sensor communication network in a master-slave configuration wherein the sensor 104-1 operate as the master device and the sensors 104-2 and 104-3 operates as the slave devices. It must be understood that each of the sensors configured to operate as the slave devices are responsible for collecting the user data and transmit the user data to the master device. The master device further may be configured to transmit the user data to the communication device 102. In various embodiments, either the master device or the communication device 102 or both process the user data to perform motion analytics for the user.

Figure 3:
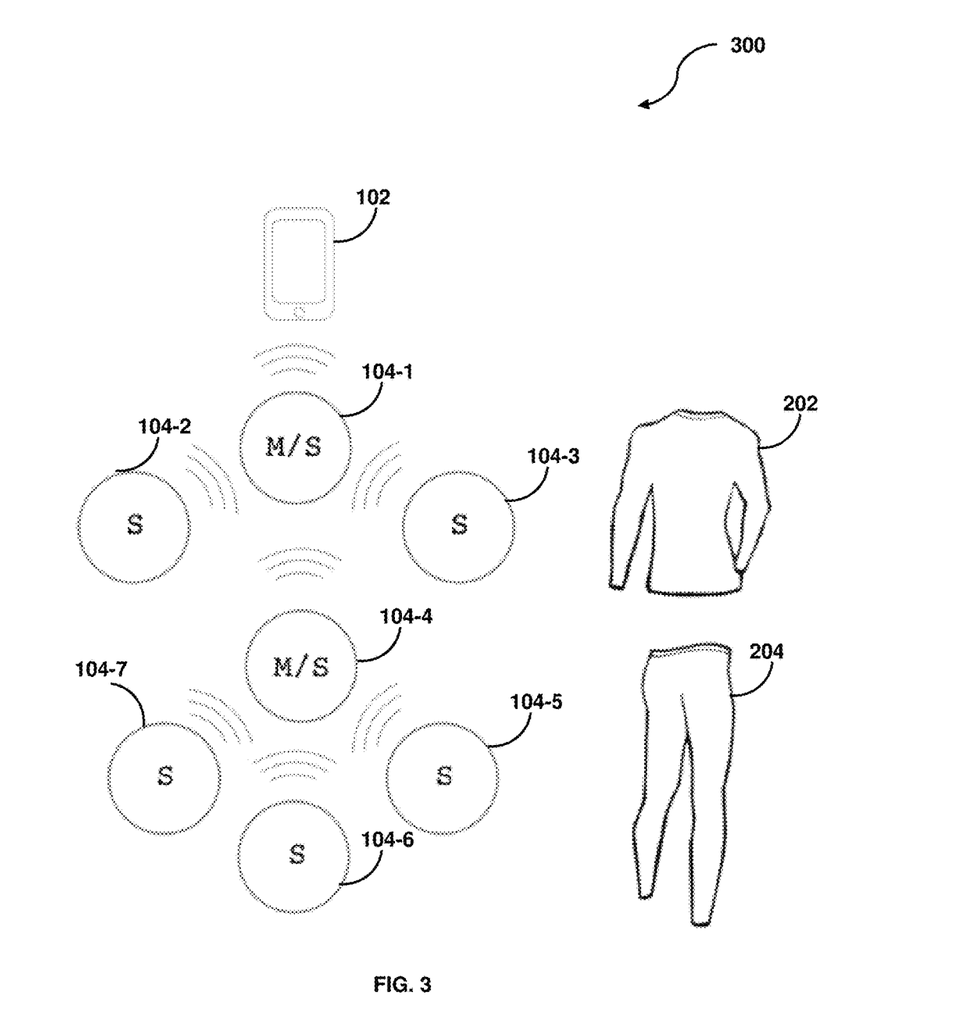
FIG. 3 illustrates an exemplary implementation 300 of the wireless communication system 100 showing connection amongst multiple sensors present within an upper garment and a lower garment of a user, in accordance with an embodiment of the present disclosure.
Figure 4:
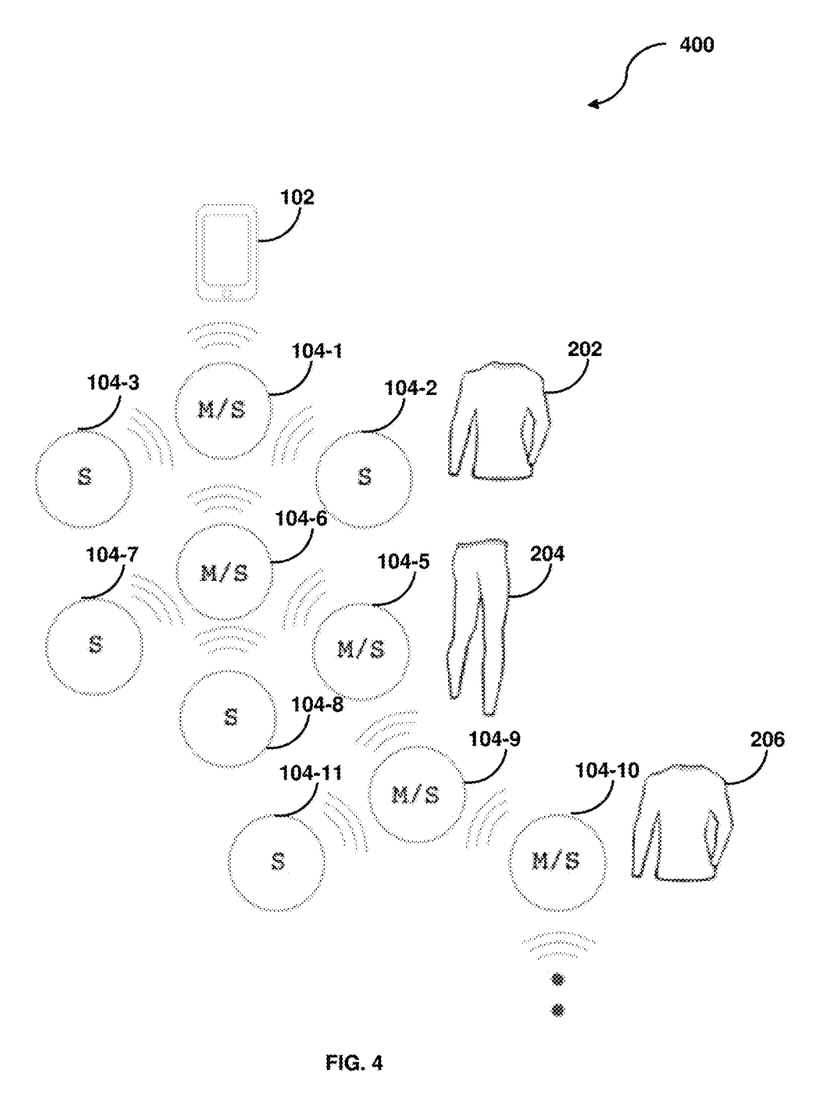
FIG. 4 illustrates an exemplary implementation 400 of the wireless communication system 100 showing connection amongst multiple sensors present within multiple garments of different users, in accordance with an embodiment of the present disclosure.

In an embodiment, the sensor communication network configured in the master-slave configuration may include sensors from multiple garments of multiple users and is not limited to the sensors within a single garment. In one example, as shown in FIG. 3, the sensor communication network comprises the sensors 104-1, 104-2, 104-3, 104-4, 104-5, 104-6 and 104-7 present within the upper garment 202 and the lower garment 204 of a single user. In another example, as shown in FIG. 4, the sensor communication network configured in the master-slave configuration may include the sensors 104-1, 104-2, 104-3, 104-4, 104-5, 104-6 104-7 and 104-8 of the upper garment 202 and the lower garment 204 of a first user and the sensors 104-9, 104-10 and 104-11 of the upper garment 206 of the second user. Therefore, in accordance with various embodiments of the present disclosure, the sensors of multiple garments from different users may be connected to form a chain connection network or branch connection network as shown in FIG. 4. It must be noted that the maximum number of chains or branches formed is not limited by the number of sensors but is dependent on the bandwidth of the communication protocol facilitating communication between the sensors. Therefore, smaller the amount of data to be transmitted, bigger is the structure of the sensor communication network.

In accordance with various embodiments of the present disclosure, the sensor communication network formed by multiple garments may be employed in group activities such as group training, sports coaching, gymnasium training and like where the users/sports trainees may unable to carry their portable devices like a smartphone having capability to track/monitor motion data of these users/sports trainees. Therefore, in this scenario, the multi-garment sensor communication network as illustrated in FIG. 4 may be employed for establishing communication between the multiple users wearing the multiple garments. Each garment is having one or more sensors to monitor biometric data and motion data associated with respective user. In an embodiment, the multi-garment network may establish two-way transmission to synchronize sports commands between the users. In an embodiment, an authorized terminal device (e.g. a smartphone) carried by a sports/gymnasium trainer or at least one of the users in the sports coaching/gymnasium training class may be configured to transmit commands in order to synchronize the motion detection algorithm amongst the users. Particularly, the authorized terminal device may transmit commands to enable sensors on each garment to capture biometric and motion data associated to each user and thereafter synchronize the data captured by each respective sensor on the authorized terminal device.

It must be further understood that each sensor shown in FIG. 1, FIG. 3 and FIG. 4 may configured to operate as a master device and the slave device simultaneously using the master-slave protocol within the communication protocol supported by each sensor. The user data generated by the sensor communication network may be uplinked to a cloud server (not shown in figures) through the communication device 102. It must be noted that since the communication device 102 may be at a larger distance from the upper garment 202 and lower garment 204 (shown in FIG. 3 and FIG. 4) as-well-as the upper garment 206 (shown in FIG. 4), a module from these garments may connect with the master device of the upper garment 202 to complete the uplink process. The communication device 102 may communicate the user data to the cloud server through a network (not shown in figures).

In one implementation, the network may be a wireless network, a wired network or a combination thereof. The network can be implemented as one of the different types of networks, such as intranet, local area network (LAN), wide area network (WAN), the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network devices, including routers, bridges, servers, computing devices, storage devices, and the like.

In an embodiment, the communication device 102 and each sensor 104 may further include a processor and a memory. The processor may be implemented as one or more microprocessors, microcomputers, microcontrollers, digital signal processors, central processing units, state machines, logic circuitries, and/or any devices that manipulate signals based on operational instructions. Among other capabilities, the processor is configured to fetch and execute computer-readable/programmed instructions stored in the memory.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, and flash memories. The memory may include modules and a data repository. The modules include routines, programs, objects, components, data structures, etc., which perform particular tasks, functions or implement particular abstract data types. The data repository, amongst other things, serves as a repository for storing data processed, received, and generated by the modules.

As discussed above, each sensor 104 may be configured to communicate with at least one sensor or the communication device 102 using the wireless communication protocol such as Bluetooth, Wi-Fi, ZigBee and NFC, etc. However, it is to be noted that the wireless signals (e.g. Bluetooth signals) may be easily interfered with outer environment especially in space and the human body which is full of water molecules. Thus, the wireless signals transmitted/received by the sensors 104 may face a technical problem of signal blockage and signal attenuation, especially considering the scenario wherein these sensors 104 serve for wearable devices, such as garments and watches, connected through wireless signals. Further, referring to FIG. 2, the motion sensing garments 202 and 204 shown are integrated with motion sensors and the wireless transmission interface 201 and 203. It may be noted from FIG. 2, that the sensors' surface points to different directions when the user is wearing the motion sensing garment. Thus, the wireless signals may be transmitted in different orientations with different angles. For example, if the user is performing an exercise, the transmission angle may be changed/modified automatically according to the human range of motion. Additionally, the environmental factors may also have a significant effect on the wireless signal being transmitted. Therefore, if the sensor operating as the master device is being shielded, it may result in significant data loss thereby leading to the failure of motion analysis.

Thus, the sensor operating as the default master may not ensure continuous stable data transmission, especially when the default master sensor is being utilized in different environments for motion data analysis pertaining to activities of different sports. Therefore, the present disclosure enables a master-slave swapping protocol facilitating instantaneous inter-switching between master and slave devices based upon different environments and different sports (either indoor or outdoor sports). In accordance with embodiments of the present disclosure, the master-slave swapping protocol may be embedded in each sensor 104 that facilitates switching of a sensor operating as the master device to a slave device and vice versa. The details of different scenarios of switching between sensors 104 is further described referring to FIG. 5 to FIG. 11 as below.

Figure 5:
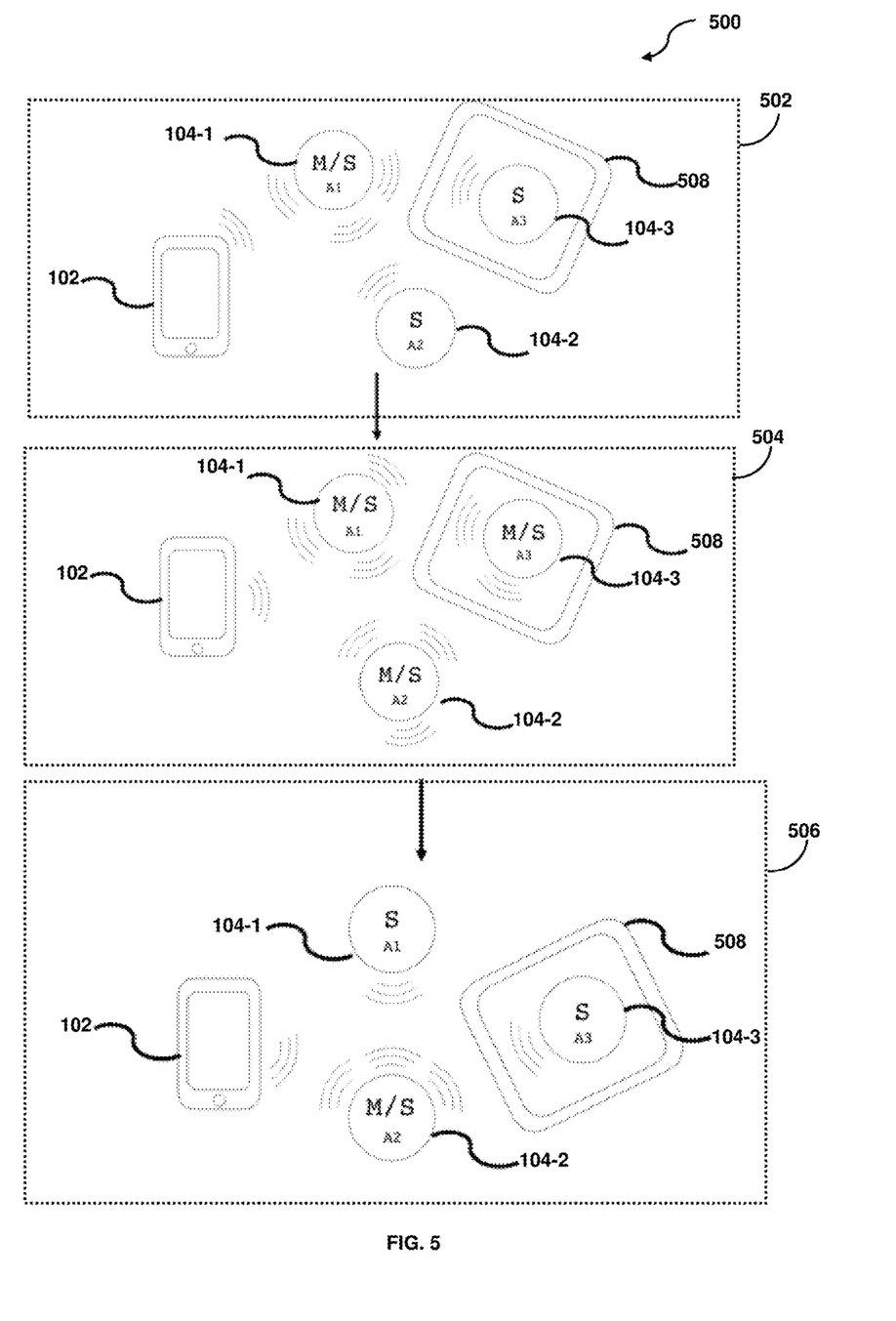
FIG. 5 illustrates a mechanism 500 of establishing wireless communication amongst the sensors attached to the one or more wearables in a scenario of regular usage of the one or more communication devices by one or more users, in accordance with an embodiment of the present disclosure.
Figure 6:
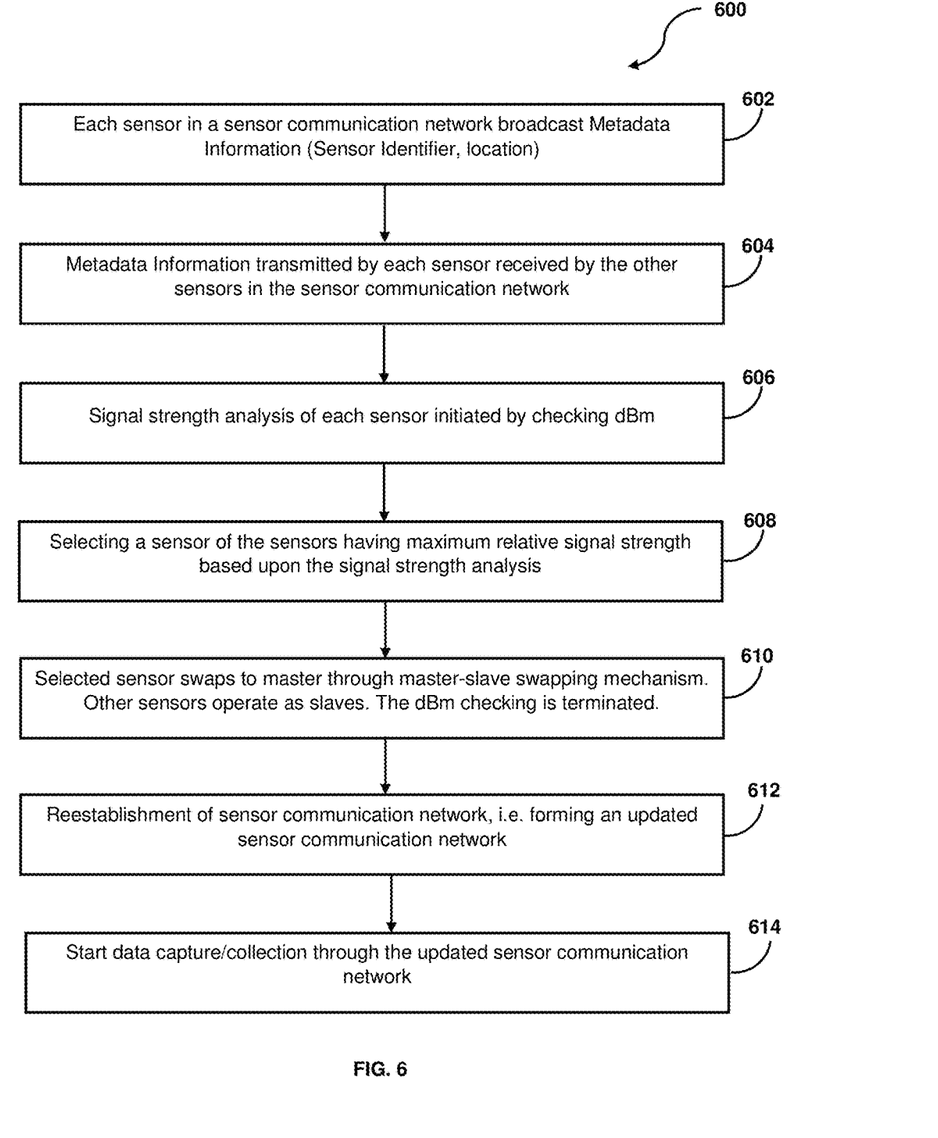
FIG. 6 illustrates a flow diagram 600 depicting steps performed for implementing the mechanism 500, in accordance with an embodiment of the present disclosure.

Referring to FIG. 5 is a mechanism 500 of establishing wireless communication amongst the sensors attached to the one or more wearables in a scenario of regular usage of the communication device 102 by the user, in accordance with an embodiment of the present disclosure. Further, referring to FIG. 6 is a flow diagram depicting steps performed for implementing the mechanism 500, in accordance with an embodiment of the present disclosure. As shown in FIG. 5, a block 502 indicates a default sensor communication network configured in a default master-slave configuration wherein the sensor 104-1 is configured to operate as the master device whereas the sensors 104-2 and 104-3 are configured to operate as the slave devices. Each of the sensors in the default communication network may be initially activated by the communication device 102 (hereinafter referred as mobile device 102). The sensors 104-2 and 104-3 may be in standby mode and connected with the default master 104-1.

Figure 7:
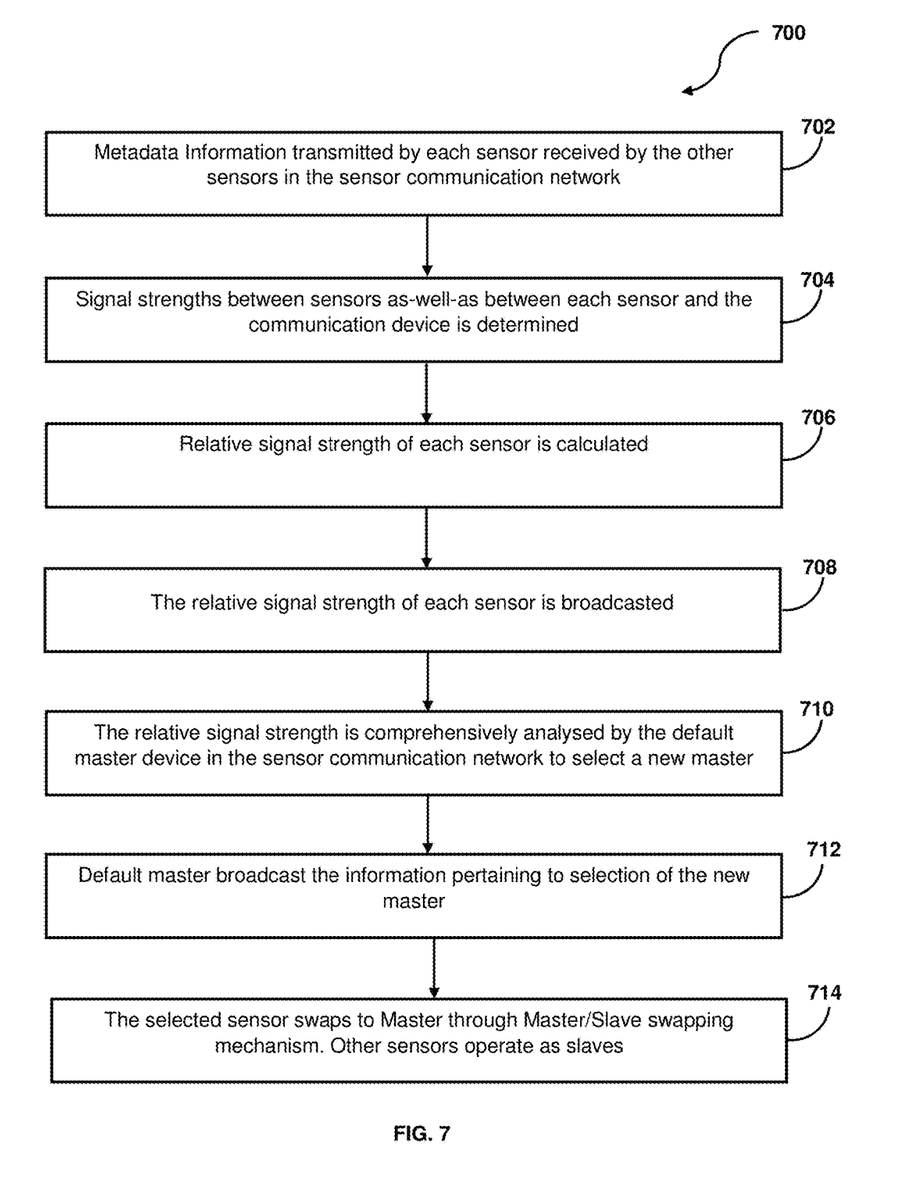
FIG. 7 illustrates a flow diagram 700 depicting process of dBm checking for facilitating signal strength analysis of each sensor, in accordance with an embodiment of the present disclosure.

Now referring to FIG. 6, at block 602, each of the sensors 104-1, 104-2 and 104-3 shown in block 502 of FIG. 5 may transmit the metadata information including the sensor identifier and the location of the garment incorporating the said sensors. At block 604, the metadata information transmitted by each sensor is received by each other sensor in the sensor communication network. At block 606, the default master device may perform signal strength analysis of each sensor by checking the signal strength of each sensor in terms of dBm. Referring to FIG. 5, block 504 indicates the signal strength analysis being performed by the master device 104-1 based upon the metadata information from the each of the sensors 104-1, 104-2 and 104-3 using dBm checking mechanism, wherein each of these sensors 104-1, 104-2 and 104-3 are capable of being operating either as the master/slave. FIG. 7 illustrate the process of dBm checking 700, in accordance with an embodiment of the present disclosure.

Referring to FIG. 7, at block 702, the metadata information transmitted by each sensor within the default sensor communication network may be received by other sensors in the default sensor communication network. At block 704, signal strength between each sensor and other sensors as-well-as the signal strength between each sensor and the mobile device is determined. At block 706, a relative signal strength of each sensor is calculated. At block 708, the relative signal strength of each sensor is broadcasted to the default master device. At block 710, the default master device may analyze the relative signal strength of each sensor in the default sensor communication network to identify a sensor having a maximum relative signal strength as compared to other sensors within the default sensor communication network. The sensor selected is a new master for the new sensor communication network or the updated sensor communication network. At block 712, the default master device may broadcast information pertaining to the selection of the new master device to the other sensors. At block 714, the sensor selected as the new master swaps to the master device via the master-slave swapping protocol and the other sensors operate as the slave devices.

Now referring to FIG. 6, based upon the dBm checking process as described above, at block 608 the default master device 104-1 may be configured to select a sensor of the sensors 104-1, 104-2 and 104-3, shown in block 504 of FIG. 5, as the new master device. As it can be clearly seen from block 504 that, there is a signal blockage 508 pertaining to the sensor 104-3. Therefore, the default master 104-1 determines that the sensor 104-3 is having weakest signal strength of the other sensors including the default master 104-1 and the sensor 104-2. The said information about the signal strength is analyzed either by the default master 104-1 or the mobile device 102 in order to select the sensor 104-2 as the new master. Now referring to FIG. 6, at block 610, the selected sensor 104-2 swaps to the master device via the master-slave swapping protocol and other sensors (i.e. sensor 104-1 and sensor 104-3) are configured to operate as the slave devices. The dBm checking process is terminated by the default master device 104-1. At block 612, a sensor communication network is re-established thereby forming an updated sensor communication network with new master 104-2 and new slave devices as 104-1 and 104-3 as indicated in block 506 shown in FIG. 5. At block 614 (shown in FIG. 6), the user data is captured using the updated sensor communication network.

Figure 8:
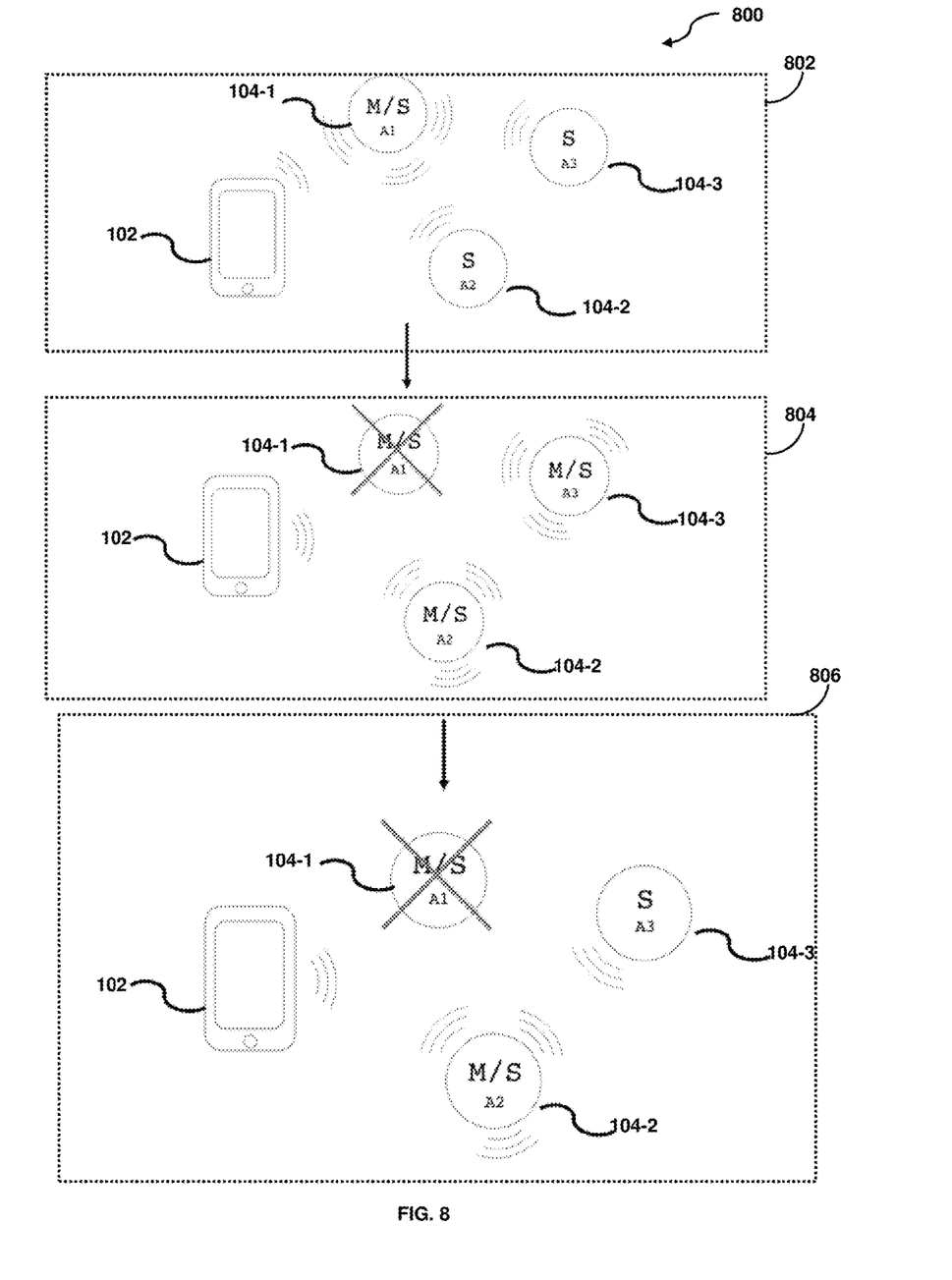
FIG. 8 illustrates a mechanism 800 of establishing wireless communication amongst the sensors attached to the one or more wearables in a scenario of usage of the one or more communication devices by one or more users for a particular selected sport, in accordance with an embodiment of the present disclosure.

Referring to FIG. 8 is a mechanism 800 of establishing wireless communication amongst the sensors attached to the one or more wearables in a scenario of usage of the communication device 102 (hereinafter referred as mobile device 102) by the user for a particular selected sport, in accordance with an embodiment of the present disclosure.

Figure 9:
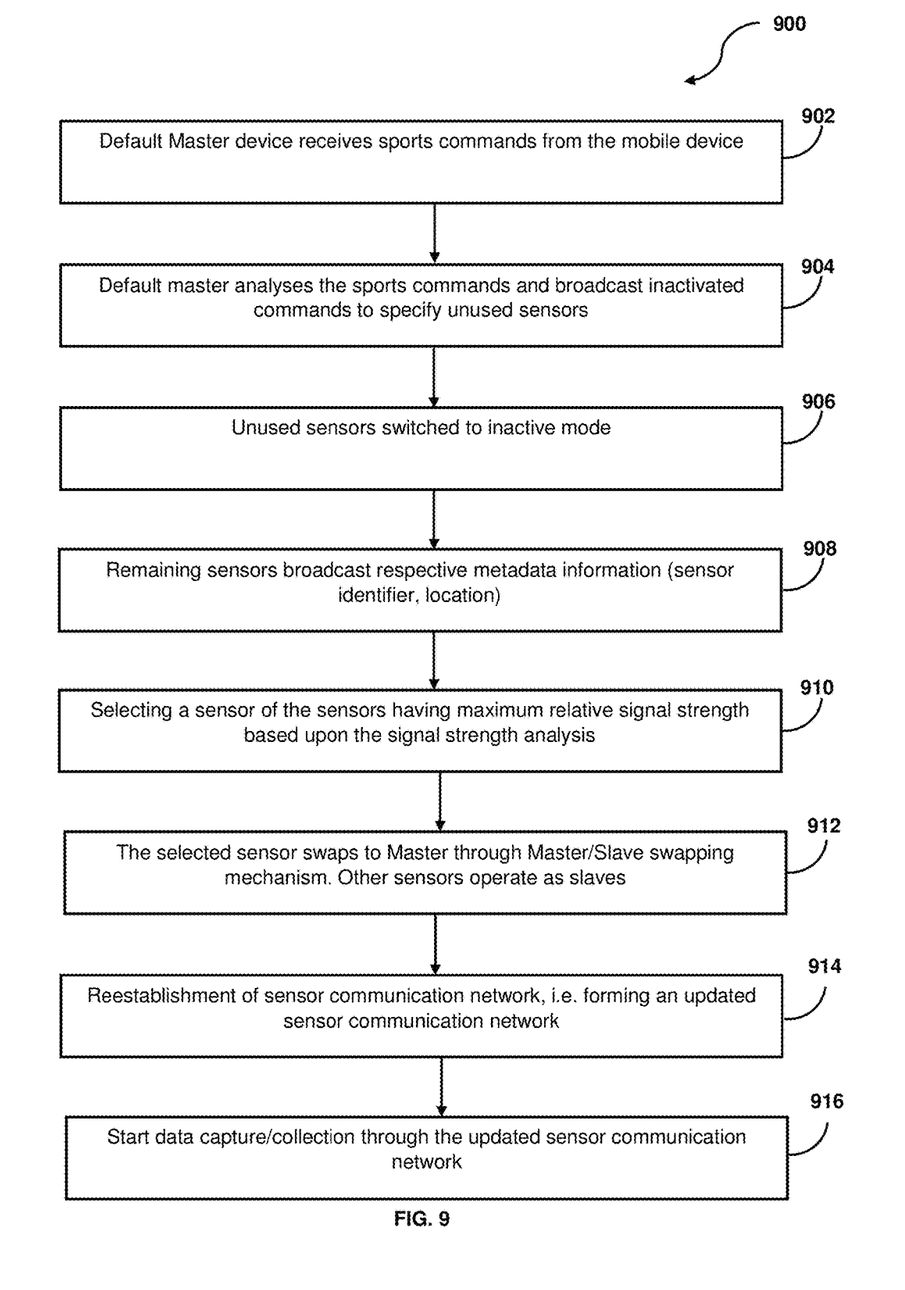
FIG. 9 illustrates a flow diagram 900 depicting steps performed for implementing the mechanism 800, in accordance with an embodiment of the present disclosure.

Further, referring to FIG. 9 is a flow diagram depicting steps performed for implementing the mechanism 800, in accordance with an embodiment of the present disclosure.

Initially, the user may select a particular sport via the mobile device 102 for which the motion data of the user is to be analyzed/processed. After the selection of the sport, the default master 104-1 is in connection with the other sensors (acting as default slaves) in a standby mode. In order to facilitate the optimization of the power, some of the default slaves may remain in inactivated state and hence may be considered as unused sensors. Referring to FIG. 9, at block 902, the default master 104-1 may receive sports commands from the mobile device 102. At block 904, the default master 104-1 analyzes the sports commands and broadcast inactivated commands to the default slave devices in inactivated state to specify the unused sensors. At block 906, the unused sensors are switched to inactivated state thereby resulting a default sensor communication network comprising the default master 104-1 and the default slave devices 104-2 and 104-3 as indicated in block 802 of FIG. 8.

At block 908, the remaining sensors (i.e. activated sensors) including the default master 104-1 and the default slave devices 104-2 and 104-3 broadcast respective metadata information including the sensor identifier, the location of the wearable (e.g. garment) incorporating the said activated sensors. Now, the default master 104-2 may perform signal strength analysis of each activated sensor based upon the metadata information from the each of the sensors 104-1, 104-2 and 104-3 using dBm checking mechanism process illustrated in FIG. 7. The signal strength analysis is performed at block 804 as shown in FIG. 8, wherein each of these sensors 104-1, 104-2 and 104-3 are capable of being operating either as the master/slave.

Now referring to FIG. 9, based upon the dBm checking process as described above, at block 910 the default master device 104-1 may be configured to select a sensor of the sensors 104-1, 104-2 and 104-3 (indicated in block 804 of FIG. 8) as the new master device based upon the signal strength analysis of each sensor. As shown in block 804, the default master 104-1 or the mobile device 102 analyzes the relative signal strength 104-1, 104-2 and 104-3 in order to select the sensor 104-2 as the new master. Specifically, the sensor 104-2 is selected as the new master since the sensor 104-2 is having the maximum relative signal strength as compared to those of the sensors 104-1 and 104-3. Now referring to FIG. 9, at block 912, the selected sensor 104-2 swaps to the master device via the master-slave swapping protocol and other sensors (i.e. sensor 104-1 and sensor 104-3) are configured to operate as the slave devices. The dBm checking process is terminated by the default master device 104-1. At block 914, a sensor communication network is re-established thereby forming an updated sensor communication network with new master 104-2 and new slave devices as 104-1 and 104-3 as indicated in block 806 shown in FIG. 8. At block 916 (shown in FIG. 9), the user data is captured using the updated sensor communication network. After the completion of the sport or the receipt of abort commands from the mobile device, all the sensors (104-1, 104-2 and 104-3) are configured to return to respective original default status as indicated in block 802 of FIG. 8. As can be noted by one skilled in the art that since only the activated sensors are put into data transmission, signal strength analysis and master-slave swapping mechanism, the present disclosure achieves saving in overall power consumption thereby facilitating in overall power optimization of the system.

Figure 10:
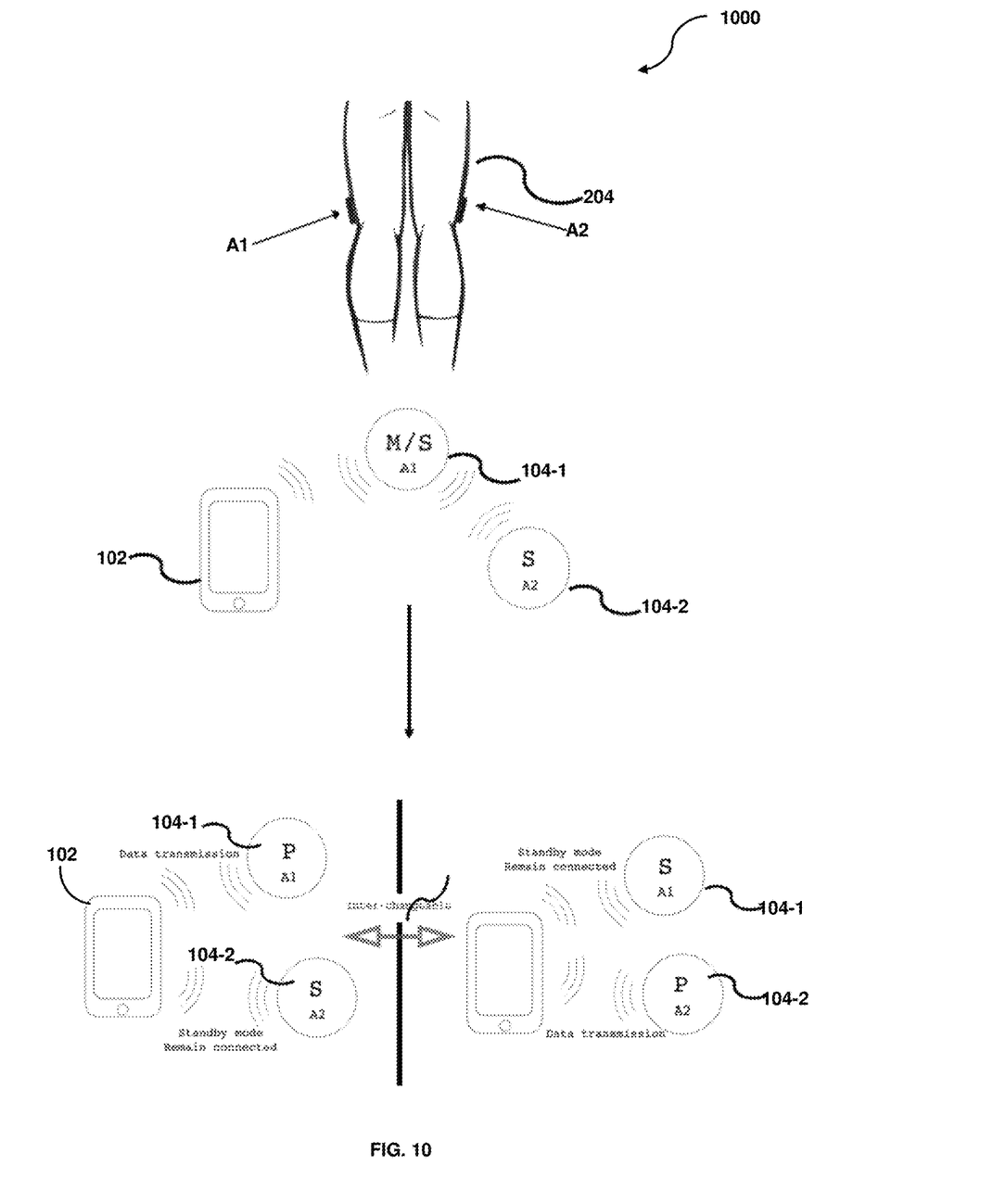
FIG. 10 illustrates a mechanism 1000 of establishing wireless communication amongst the sensors attached to the one or more wearables in a scenario of usage of the one or more communication devices by one or more users for a particular selected sport with repeated motion patterns, in accordance with an embodiment of the present disclosure.
Figure 11:
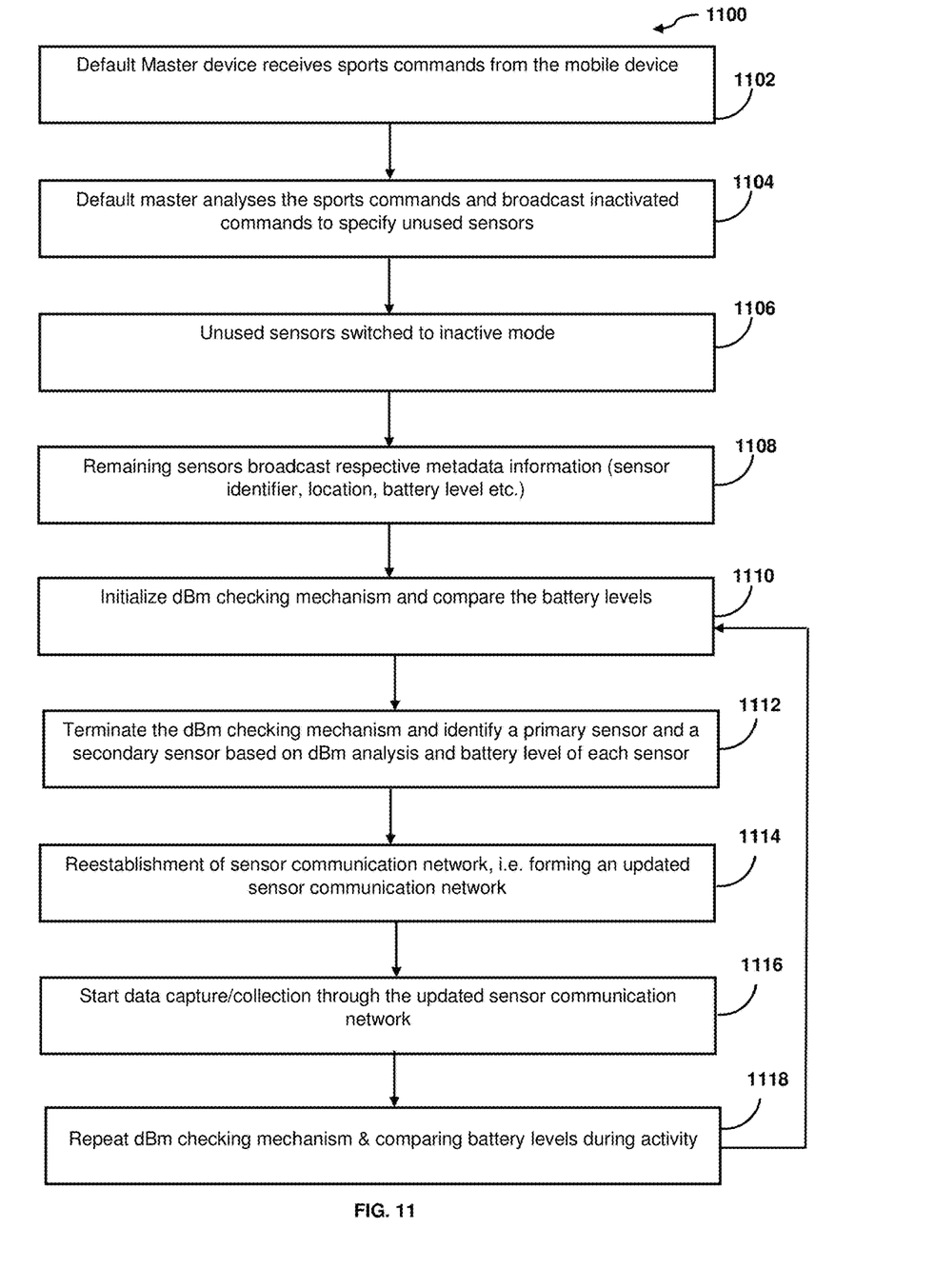
FIG. 11 illustrates a flow diagram 1100 depicting steps performed for implementing the mechanism 1000, in accordance with an embodiment of the present disclosure.

Referring to FIG. 10 is a mechanism 1000 of establishing wireless communication amongst the sensors attached to the one or more wearables in a scenario of usage of the communication device 102 (hereinafter referred as mobile device 102) by the user for a particular selected sport with repeated motion patterns, in accordance with an embodiment of the present disclosure. Further, referring to FIG. 11 is a flow diagram depicting steps performed for implementing the mechanism 1000, in accordance with an embodiment of the present disclosure.

Initially, the user may select a particular sport via the mobile device 102 for which the motion data of the user is to be analyzed/processed. In order to facilitate the optimization of the power, some of the default slaves may remain in inactivated state and hence may be considered as unused sensors. Referring to FIG. 11, at block 1102, the default master 104-1 may receive sports commands from the mobile device 102. At block 1104, the default master 104-1 analyzes the sports commands and broadcast inactivated commands to the default slave devices in inactivated state to specify the unused sensors. At block 1106, the unused sensors are switched to inactivated state thereby resulting a default sensor communication network comprising the default master 104-1 and a default slave device 104-2 as indicated in FIG. 10. Further, at block 1108 (shown in FIG. 11), the remaining sensors (i.e. activated sensors) including the default master 104-1 and the default slave device 104-2 broadcast respective metadata information including the sensor identifier, the location of the wearable (e.g. garment) incorporating the said activated sensors and the respective battery level. At block 1110, the signal strength between the sensors 104-1 and 104-2 as-well-as the signal strength between each sensor (104-1 and 104-2) is determined simultaneously using the dBm checking process. Further, at block 1110 the battery level of each sensor is compared. At block 1112, the dBm checking process is terminated and based upon the signal strength analysis and the comparison of battery level, one of the sensors (sensor 104-1 shown in FIG. 10) is identified as a primary sensor and the other sensor (sensor 104-2 shown in FIG. 10) is identified as the secondary sensor. The primary sensor (sensor 104-1 in this case) is having more relative signal strength and the battery level as compared to the secondary sensor (sensor 104-2 in this case). The primary sensor is responsible for capturing/collecting the user data whereas the secondary sensor, though, not configured to capture the data remains connected with the default master in low power consumption within the sensor communication network.

At block 1114, a sensor communication network is re-established thereby forming an updated sensor communication network. At block 1116 (shown in FIG. 11), the user data may be captured using the updated sensor communication network. At block 1118 (shown in FIG. 11), during exercise or performing any activity related to the sport, both the primary sensor 104-1 and the secondary sensor 104-2 may continuously evaluate the relative signal strength and the battery level of the respective sensors. If the relative signal strength and the battery level are changed due to outer environment, the status of the primary sensor and the secondary sensor may be swapped. In one example, if the signal strength and battery level of the secondary sensor 104-2 is determined higher than the primary sensor 104-1, the characteristics of the primary sensor 104-1 and the secondary sensor 104-2 may be swapped as shown in FIG. 10. As illustrated in FIG. 10, due to swapping of the characteristics, the original secondary sensor 104-2 is switched to operate as the new primary sensor 104-1 and therefore is now responsible for capturing/collecting the user data. The original primary sensor 104-1 is switched to operate as the new secondary sensor 104-2 thereby enabled to stop the user data capture/collection and configured to remain connected to the master device or the mobile device in low power consumption. The aforementioned switching mechanism is iteratively performed in the whole exercise till the sport is finished or the abort commands are received from the mobile device.

Exemplary embodiments discussed above may provide certain advantages. Though not required to practice aspects of the disclosure, these advantages may include those provided by the following features.

Some embodiments of the present disclosure enable a system and method for facilitating wireless communication amongst sensors attached to one or more wearables.

Some embodiments of the present disclosure enable a system and method for adaptively switching of the sensors to operate either as a master device or a slave device via master-slave swapping mechanism, wherein the slave device is configured to collect sensor data and transmit to the user device via the master device.

Some embodiments of the present disclosure enable a system and method for adaptively switching of the sensors to operate either as a primary sensor or secondary sensor, wherein the primary sensor is responsible to collect sensor data whereas the secondary sensor acts as a backup for primary sensor such that it is configured to collect/capture the sensor data only on account of failure of the primary sensor.

Some embodiments of the present disclosure enable a system and method for connection of the sensors present within the multiple garments of the same or different individuals thereby forming a chain or branch of sensor connections.

Some embodiments of the present disclosure enable a system and method for facilitating power optimization of the wireless communication system by enabling the inactivate sensors or the secondary sensors to connect with the default master device in low power consumption mode.

Some embodiments of the present disclosure enable a system and method for enabling a garment network that facilitates establishing two-way transmission to synchronize sports commands between users, wherein authorized communication devices may be configured to send commands to the garment network in order to synchronize the motion detection amount for the users.

Although implementations for methods and systems for facilitating wireless communication amongst a plurality of sensors have been described in language specific to structural features and/or methods, it is to be understood that the appended claims are not necessarily limited to the specific features or methods described. Rather, the specific features and methods are disclosed as examples of implementations for facilitating wireless communication amongst a plurality of sensors.

What is claimed is:

1. A wireless communication system, comprising:
   a plurality of sensors attached to one or more wearables, wherein each of the plurality of sensors are configured to operate either as a master device or a slave device, wherein the plurality of sensors are inter-communicatively coupled to establish a sensor communication network wherein one of the sensors operates as the master device and the other sensors operates as the slave devices, and wherein a set of sensors, of the plurality of sensors are configured to broadcast metadata information to at least one other sensor within the sensor communication network, wherein the metadata information comprises sensor identifier, location of the one or more wearables, a battery level of the sensor, and a current time, and wherein the sensor communication network is updated based upon the metadata information received from each of the set of sensors to form an updated sensor communication network, wherein the sensor communication network is updated by swapping one of the slave devices with the master device, and wherein the slave device being swapped is configured to operate as a new master device for the updated sensor communication network; and
   a processor configured to process the metadata information received from each sensor to determine a first signal level indicative of signal strength (dBm) between each sensor and at least one other sensor, a second signal level (dBm) indicative of signal strength between each sensor and the one or more communication devices, and a relative signal strength (dBm) of each sensor, wherein the slave device swapped with the master device to operate as the new master device for the updated sensor communication network is having the maximum relative signal strength as compared to the other sensors in the sensor communication network.

2. The wireless communication system of claim 1, wherein each slave device in the sensor communication network or the updated sensor communication network is further configured to capture sensor data comprising at least motion data and biometric data associated to one or more users wearing the one or more wearables, wherein the one or more wearables are further in communication with one or more communication devices belonging to the one or more users.

3. The wireless communication system of claim 2, wherein the sensor data is captured by each slave device in response to an input received from the one or more communication devices via the master device, wherein the sensor data is further transmitted by each slave device to the one or more communication devices via the master device.

4. The wireless communication system of claim 1, wherein each of the plurality of sensors communicate via a communication protocol selected from a group comprising at least one of Bluetooth, Wi-Fi, ZigBee and Near field communication (NFC).

5. The wireless communication system of claim 1, wherein, based upon the relative signal strength and the battery level, the processor is further configured to designate at least one slave device and at least one other slave device in either of the sensor communication network or the updated sensor communication network as a primary sensor and a secondary sensor respectively, wherein the primary sensor is configured to capture the sensor data and the secondary sensor act as a backup of the primary sensor.

6. The wireless communication system of claim 5, wherein the processor is further configured to swap the primary sensor with the secondary sensor or one of the other slave devices within the sensor communication network or the updated sensor communication network based upon the relative signal strength and the battery level of the primary sensor, the secondary sensor and one or more other slave devices within sensor communication network or the updated sensor communication network.

7. The wireless communication system of claim 5, wherein the processor is further configured to swap the secondary sensor with the primary sensor or one of the other slave devices within the sensor communication network or the updated sensor communication network based upon the relative signal strength and the battery level of the secondary sensor, the primary sensor and one or more other slave devices within sensor communication network or the updated sensor communication network.

8. A method for facilitating wireless communication amongst a plurality of sensors, the method comprising:
providing a plurality of sensors attached to one or more wearables, wherein each of the plurality of sensors is configured to operate either as a master device or a slave device;
establishing a sensor communication network wherein one of the sensors operates as the master device and the other sensors operates as the slave devices;
broadcasting, by a set of sensors of the plurality of sensors, metadata information to at least one other sensor within the sensor communication network, wherein the metadata information comprises sensor identifier, location of the one or more wearables, a battery level of the sensor, and a current time;
processing, via a processor, the metadata information received from each sensor to determine a first signal level indicative of signal strength (dBm) between each sensor and at least one other sensor, a second signal level (dBm) indicative of signal strength between each sensor and the one or more communication devices, and a relative signal strength (dBm) of each sensor; and
updating the sensor communication network based upon the metadata information received from each of the set of sensors to form an updated sensor communication network, wherein the sensor communication network is updated by swapping one of the slave devices with the master device, and wherein the slave device being swapped is configured to operate as a new master device for the updated sensor communication network and is having the maximum relative signal strength as compared to the other sensors in the sensor communication network.

9. The method of claim 8, wherein each slave device in the sensor communication network or the updated sensor communication network is further configured to capture sensor data comprising at least motion data and biometric data associated to one or more users wearing the one or more wearables, wherein the one or more wearables are further in communication with one or more communication devices.

10. The method of claim 9, wherein the sensor data is captured by each slave device in response to an input received from the one or more communication devices via the master device, wherein the sensor data is further transmitted by each slave device to the one or more communication devices via the master device.

11. The method of claim 8, wherein each of the plurality of sensors communicate via a communication protocol selected from a group comprising at least one of Bluetooth, Wi-Fi, ZigBee and Near field communication (NFC).

12. The method of claim 8, wherein, based upon the relative signal strength and the battery level, the processor is further configured to designate at least one slave device and at least one other slave device in either of the sensor communication network or the updated sensor communication network as a primary sensor and a secondary sensor respectively, wherein the primary sensor is configured to capture the sensor data and the secondary sensor act as a backup of the primary sensor.

13. The method of claim 12, wherein the processor is further configured to swap the primary sensor with the secondary sensor or one of the other slave devices within the sensor communication network or the updated sensor communication network based upon the relative signal strength and the battery level of the primary sensor, the secondary sensor and one or more other slave devices within sensor communication network or the updated sensor communication network.

14. The method of claim 12, wherein the processor is further configured to swap the secondary sensor with the primary sensor or one of the other slave devices within the sensor communication network or the updated sensor communication network based upon the relative signal strength and the battery level of the secondary sensor, the primary sensor and one or more other slave devices within sensor communication network or the updated sensor communication network.

* * * * *